June 5, 1956    J. J. ROHRBACH    2,748,655
SPECTACLE FRAMES
Filed April 12, 1952
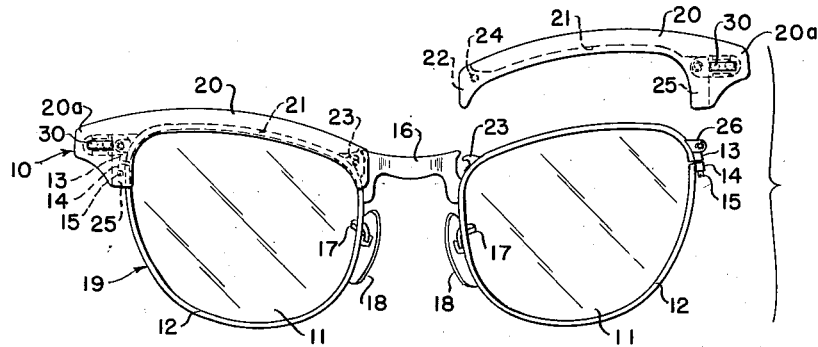
FIG. 1
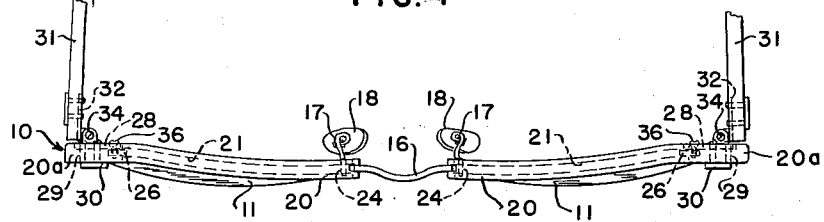
FIG. 2
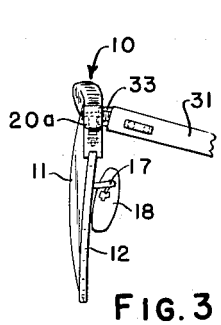
FIG. 3
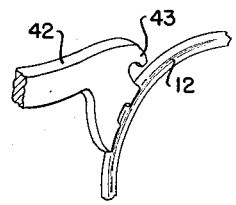
FIG. 8
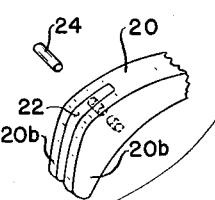
FIG. 4
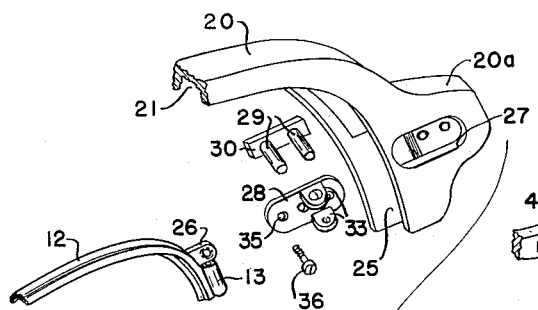
FIG. 6
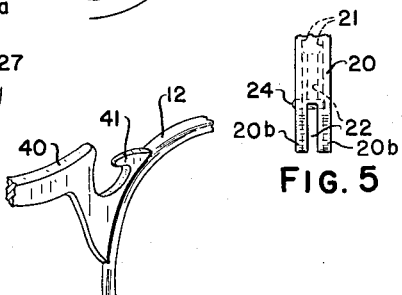
FIG. 7
FIG. 5
JOHN J. ROHRBACH
INVENTOR
BY Theodore E. Simonton
ATTORNEY

2,748,655

SPECTACLE FRAMES

John J. Rohrbach, Rochester, N. Y., assignor to Shuron Optical Company, Inc., Geneva, N. Y., a corporation of New York Application April 12, 1952, Serial No. 282,059

3 Claims. (Cl. 88—41)

This invention relates to spectacle frames and relates more particularly to an interchangeable combination metal and plastic frame.

Spectacles with plastic top arms and metallic eyewires about the lenses, combine the pleasing appearance of plastic frames with the strength and the full view feature in the lower visual portions of a metal spectacle frame. Interchangeable plastic top arm portions make it possible for a wholesaler or manufacturing retailer to offer a wide variety of style and color combinations without stocking an undue number of frames. The plastic top arm portions may be supplied in a number of styles and colors and may be used interchangeably with a wide variety of metal frame portions having different styles and sizes of bridges.

By my invention, I am enabled to secure the plastic top arm portions to the metal lens-retaining portion of the frame with sufficient rigidity to withstand all the normal stresses of use. The securing means, moreover, are so devised that the plastic top arms may be repeatedly secured to and disassembled from the metal frame portion without appreciable wear or damage.

The principal object of my invention is to provide fastenings for both the nasal and temporal ends of each plastic top arm portion whereby such portion may be securely attached to the metal lens-retaining unit.

Further objects of my invention are to provide fastenings for plastic top arm portions which may be readily detached and secured, and which may be attached and detached without excessive wear, so that said portions are readily demountable and interchangeable.

A still further object is to make said fastenings concealed and inconspicuous so as to obtain a spectacle frame which is pleasing to the eye and flattering to the appearance of the wearer.

Other objects and advantages of my invention will become apparent upon reading the following specification in conjunction with the accompanying drawing, in which:

Figure 1 is a front elevation of a pair of spectacles embodying my invention, one of the top arm portions thereof being removed from the frame and shown as in an exploded view;

Figure 2 is a top plan view of the spectacles of Figure 1;

Figure 3 is a side elevation thereof;

Figure 4 is an enlarged exploded perspective view of the fastening means employed at the nasal end of the top arm portion;

Figure 5 is an enlarged fragmentary top plan view of the nasal end of the top arm portion of Figure 4;

Figure 6 is an enlarged exploded perspective view, as seen from the rear, of the fastening means employed at the temporal end of said top arm portion;

Figure 7 is an enlarged perspective view of a modified form of bridge; and

Figure 8 is an enlarged perspective view of another modified form of bridge.

The spectacles 10 shown in the drawing comprise lenses 11 secured in eyewires 12 which surround and conform to the edge of each lens. Each eyewire 12 is secured in well known fashion, about its lens, by means of the threaded tube 13 and the plain tube 14 soldered or otherwise joined to the ends of the eyewire 12, and the screw 15. The eyewires 12 are secured to either end of the metal bridge 16 by soldering or otherwise. A nasal assembly 17 is secured to the nasal side of each eyewire 12 by soldering or otherwise and includes a nose pad 18 and associated parts which are illustrated as being of the general type disclosed in Krapp United States Patent 2,257,966, issued October 7, 1941, but may be of any other suitable construction.

Eyewires 12, lens securing means 13—14—15 and bridge 16 form a metal lens-retaining unit which, with the nasal assemblies 17, constitutes a rigid, metal spectacle front 19 to which the plastic top arms 20 are demountably secured. The hooks 23 and lugs 26, later described, are also integral parts of the spectacle front 19.

The top arms 20 are of zylonite or other plastic and may be of any shape pleasing to the eye and generally conforming to the shape of the top edge of eyewire 12. A groove 21 in the lower edge of each top arm is so shaped that the upper portion of the eyewire along the top of the lens is concealed therein when the top arm 20 is secured to the spectacle front 19. A temporal extension 20a is provided for the support of the usual temple hinge. The nasal end of each top arm 20 is slotted at 22 to permit the portions 20b—20b at this end (Figure 5) to extend down at the front and rear of the eyewire adjacent the bridge and to conceal the fastening hook 23 which is soldered, or otherwise joined, radially to the eyewire immediately above the bridge 16. A pin 24 extends horizontally across slot 22 from the rear face of the top arm almost to the front face thereof (Figure 5) so as to be inviisible from the front. Pin 24 is engaged in the hook 23 when top arm 20 is assembled to the metal spectacle front 19.

The temporal end of top arm 20 extends down along the temporal side of lens 11 at the inner edge of the temporal extension 20a. A centrally located recess 25 extends substantially vertically along this inside edge, inside the temporal extension 20a, to accommodate and conceal the tubes 13 and 14 and the screw 15 of the lens securing means as more fully described in my United States Patent 2,554,386 dated May 22, 1951. The recess 25 extends sufficiently high into the top arm 20 to also accommodate and conceal the lug 26 which is soldered, or otherwise joined, radially to each eyewire 12 immediately above the threaded tube 13. Lug 26 has a threaded hole centrally and substantially horizontally therethrough.

Slot 22 and recess 25 intersect groove 21 at either end and constitute prolongations thereof to form one continuous groove along the entire inside edge of top arm 20.

Another recess 27 (Figure 6) extends substantially horizontally in the rear face of the temporal extension 20a of each top arm 20 and is of sufficient depth to accommodate the hinge plate 28 in well known fashion, so that the hinge plate, when assembled, is imbedded in the plastic top arm with its outer surface substantially level with the rear surface of the top arm. Hinge plate 28 is secured to the top arm in conventional fashion by two rivets 29 extending through the temporal extension 20a of the top arm and through the plate 28, the rear ends of the rivets being peened over the plate. The front ends of rivets 29 are secured by soldering or otherwise to a placque 30 so as to be effectively concealed.

Temples 31 are hingedly secured to the top arms 20 in conventional manner by the hinge members 32 which are connected to the hinge ears 33 of hinge plates 28 by pintles 34 (Figure 2).

Recess 27, at its inner end, intersects the recess 25 so that a portion of the plate 28, when assembled to the top arm, abuts the lug 26 in recess 25. Hinge plate 28 has a hole 35 therethrough at its inner end for the screw 36 which secures the top arm 20 to the metal spectacle front 19 when it is inserted through hole 35 into the threaded hole in lug 26.

To detach the top arm 20 and its attached temple 31 from the metal spectacle front 19, the screw 36 is removed, and the temporal end of top arm 20 is raised so that the tubes 13 and 14 and lug 26 are no longer in recess 25. Top arm 20 may then be moved slightly toward bridge 16 and the pin 24 disengaged from hook 23 and lifted up between hook 23 and bridge 16.

To again secure the top arm 20 to the spectacle front 19, the nasal end of the top arm is simply moved downward so that the slot 22 passes down about hook 23, the pin 24 is slid between the hook and bridge 16 and is engaged in hook 23. The temporal end of top arm 20 is then lowered so that the upper edge of the lens 11 and eyewire 12 is contained in groove 21, lug 26 and tubes 13 and 14 are contained in recess 25, and the hole 35 in hinge plate 28 is lined up with the threaded hole in lug 26. Screw 36 is then inserted and screwed firmly into place. Top arm 20 is thereby locked securely to the rest of frame 10 and the interengagement of hook 23, eyewire 12, and lug 26, with slot 22, groove 21 and recess 25, respectively, together with the clamping of lug 26 against hinge plate 28 by means of the screw 36 gives additional rigidity and strength to the metal spectacle front which supports the lenses.

The modified bridge 40 of Figure 7 is in all respects like bridge 16 of Figures 1–6 except that a hook 41 is integral with bridge 40. When bridge 40 is soldered to the eyewire 12, hook 41 occupies the position of hook 23 in the other figures and serves the same function of engaging with the pin 24 of top arm 20, thus effectively locking top arm 20 to the bridge 40.

The modified bridge 42 of Figure 8 is secured on either side to the eyewires 12 by soldering or otherwise. Bridge 42 differs from the bridges 16 and 40 of Figures 4 and 7 in that it has a hook 43, on either side, opening down toward the eyewire 12 and adapted to engage the pin 24 from above. When bridge 42 is used, the nasal end of top arm 20 is engaged with, or disengaged from the metal front by sliding the pin 24 between hook 43 and eyewire 12 and engaging or disengaging pin 24 and hook 43.

It will be apparent, in the preferred construction shown in the drawing, that the eyewires 12—12 are slightly wider from front to rear than the bridges 16, 40 and 42. Groove 21, therefore, is slightly wider than the slot 22, as best seen in Figure 5. When bridge 42 is used, the sides 20b—20b of the nasal end of top arm 20 on either side of slot 22 must necessarily be forced apart slightly when the temporal end of top arm 20 is raised to disengage the top arm from the metal front. Due to the resiliency of the plastic material, however, the sides 20b—20b spring back into shape when pin 24 is disengaged from hook 43 and top arm 20 is removed from the metal front. Similarly, to replace top arm 20, the sides 20b—20b must be forced apart slightly to engage pin 24 in hook 43. When the temporal end of the top arm is lowered again with lug 26 in the recess 25, the sides 20b—20b spring back on either side of bridge 42 and the end of bridge 42 is closely contained in slot 22 and eyewire 12 lies in the groove 21.

It will be apparent that the spectacles of the present invention provide durable and effective means for securing demountable plastic top arms to a unitary, metallic lens-retaining portion of the frame. It will also be apparent that the plastic top arms are readily demountable, thereby allowing dealers to provide a wider selection of style and color combinations without unduly increasing their stock. Moreover, the means for securing top arms 20 to the spectacle front 19 are simple and durable, whereby frequent detaching and securing of the top arms to the remaining portions of the frame results in no appreciable damage or wear to the frame.

While illustrative embodiments of the invention are herein described and shown in the drawings, it is to be understood that the invention is not limited thereto, but may comprehend other constructions, arrangements of parts, details and features without departing from the spirit of the invention. I desire to be limited, therefore, only by the scope of the appended claims.

I claim:

1. A spectacle frame of the type having a metallic lens-retaining unit and a pair of plastic top arms removably secured thereto, said unit including a metallic bridge, a pair of metallic eyewires fixedly joined to said bridge at either side and adapted to surround a pair of lenses, and clamping means at the temporal ends of said eyewires for securing said eyewires around the lenses, and said top arms each having a central groove along the lower edge thereof for receiving and concealing the upper portions of the eyewires and the clamping means, characterized by said metallic unit having a hook adjacent each side of the bridge projecting above the adjacent eyewire and having an apertured lug adjacent each of said clamping means, said hooks and said lugs being adapted to be concealed in said top arm grooves, each top arm having a slot at its nasal end to straddle the adjacent portion of the bridge and having a pin extending across said slot for engaging the adjacent hook, each top arm having a temple hinge plate secured at its rear side to its temporal end which has a portion overlying said groove, a temple pivotally connected to each hinge plate, each of said hinge plates having a hole through the overlying portion which is in alignment with the aperture of the adjacent lug when the top arm is mounted on the metallic unit, and a removable fastening screw located in each aligned hole and aperture and threadedly engaging one of them to secure the adjacent lug to and against the adjacent hinge plate, whereby said top arms are demountably secured to said metallic unit and each top arm is separately removable therefrom in a single assembly with its associated temple by removing the associated fastening screw and rocking the associated pin out of engagement with the associated hook.

2. In a spectacle frame of the type having a metallic lens-retaining unit and a pair of plastic top arms secured thereto, said unit including a metallic bridge, a pair of metallic eyewires joined to said bridge at either side and adapted to surround a pair of lenses, and clamping means at the temporal ends of said eyewires for securing said eyewires around the lenses, and said top arms each having a central groove along the lower edge thereof for receiving and concealing the upper portions of the eyewires and the clamping means, in combination, hooks adjacent each side of the bridge projecting above the adjacent eyewire and a threaded apertured lug adjacent to and above each said clamping means, said hooks and said lugs being secured to said metallic unit and being adapted to be concealed in said top arm grooves, each top arm having a slot at its nasal end and having a pin extending across said slot for engaging the adjacent hook, each top arm having a temporal extension provided with a central vertical recess along its inner edge forming an extension of said groove and adapted to receive said clamping means and said lug, each of said temporal extensions having a second recess in its rear surface, a portion of said second recess intersecting and communicating with said first recess, a temple hinge plate secured in each of said second recesses and having a portion overlying said intersecting recess portions, a temple pivotally connected to each hinge plate, each of said hinge plates having a hole through the overlying portion thereof in alignment with the aperture of the adjacent lug when the top arm is mounted on the metallic unit, and a removable fastening screw passing through each hole and threadedly engaging the corresponding aperture to secure the adjacent lug to and against the associated hinge plate, whereby said top arms are demountably secured to said metallic unit and each top arm is separately removable therefrom in a single assembly with its associated temple.

3. A spectacle frame comprising a metallic lens-retaining unit, and a pair of plastic top arms, said unit including a pair of metallic eyewires, each of which is adapted to surround a lens, clamping means at the temporal end of each eyewire for securing the eyewire around a lens, a metallic bridge rigidly secured at its opposite ends to the eyewires at the nasal sides thereof, a lug secured to each eyewire at its temporal end above its clamping means, and a hook rigidly secured to each eyewire adjacent its nasal end, the two hooks of the two eyewires facing each other, each of said top arms having a groove along its lower edge for receiving and concealing the upper portion of the associated eyewire and a communicating slot at its nasal end to straddle the adjacent portion of said bridge, each top arm having a pin extending transversely across said slot for detachably engaging one of said hooks, a temple hinge plate secured at the rear side of each top arm adjacent the temporal end thereof and having a portion overlying the groove in the top arm, a temple hingedly connected to each hinge plate, each hinge plate and the associated lug having a pair of aligned holes, and a removable fastening screw located in one hole of each pair of aligned holes and threadedly engaging the other hole of the pair, whereby each top arm is demountably secured to said unit and is separately removable therefrom with its associated temple by removing the associated fastening screw and rocking the associated pin out of engagement with the associated hook.

References Cited in the file of this patent

UNITED STATES PATENTS

| | | |
|---|---|---|
| 2,577,380 | Stegeman | Dec. 4, 1951 |
| 2,594,395 | Castelli | Apr. 29, 1952 |
| 2,627,783 | Splaine | Feb. 10, 1953 |
| 2,696,756 | Salierno | Dec. 14, 1954 |